(12) United States Patent
Tacilauskas

(10) Patent No.: US 7,084,776 B2
(45) Date of Patent: Aug. 1, 2006

(54) FLUID DETECTION APPARATUS AND KIT, AND METHOD OF INSTALLATION THEREOF

(76) Inventor: Andrew Victor Tacilauskas, 3562 Falcon Crescent, Whistler (CA) V0N 1B3

( * ) Notice: Subject to any disclaimer, the term of this patent is extended or adjusted under 35 U.S.C. 154(b) by 40 days.

(21) Appl. No.: 10/894,214

(22) Filed: Jul. 19, 2004

(65) Prior Publication Data

US 2006/0012485 A1    Jan. 19, 2006

(51) Int. Cl.
*G08B 21/00* (2006.01)

(52) U.S. Cl. ......................... 340/604; 340/605

(58) Field of Classification Search ............... 340/602, 340/604, 605; 324/664, 693; 73/40, 40.5 R, 73/605; 137/312
See application file for complete search history.

(56) References Cited

U.S. PATENT DOCUMENTS

| | | | |
|---|---|---|---|
| 4,135,151 A | 1/1979 | Rogers et al. | 324/664 |
| 4,227,190 A | 10/1980 | Kelley et al. | 340/604 |
| 4,404,516 A | 9/1983 | Johnson, Jr. | 324/557 |
| 4,598,277 A | 7/1986 | Feldman | 340/604 |
| 5,043,839 A * | 8/1991 | Wallace | 361/220 |
| 5,058,421 A | 10/1991 | Alexander et al. | 340/620 |
| 5,081,422 A * | 1/1992 | Shih | 324/693 |
| 5,188,143 A | 2/1993 | Krebs | 137/312 |
| 5,269,173 A | 12/1993 | Henneck et al. | 73/49.2 |
| 5,334,970 A * | 8/1994 | Bailey | 340/506 |
| 5,655,561 A | 8/1997 | Wendel et al. | 137/79 |
| 5,748,092 A | 5/1998 | Arsenault et al. | 340/604 |
| 6,208,262 B1 | 3/2001 | Jones | 340/693.5 |
| 6,377,181 B1 | 4/2002 | Kroll et al. | 340/604 |
| 6,639,517 B1 | 10/2003 | Chapman et al. | 340/605 |
| 6,675,826 B1 | 1/2004 | Newman et al. | 137/312 |
| 6,731,215 B1 | 5/2004 | Harms et al. | 340/605 |

FOREIGN PATENT DOCUMENTS

| | | |
|---|---|---|
| CA | 1271540 | 7/1990 |
| CA | 2269483 | 10/2000 |
| CA | 2351133 A1 | 2/2002 |
| CA | 2430645 A1 | 5/2005 |
| EP | 0 313 264 * | 4/1989 |
| EP | 0884434 | 12/1998 |

OTHER PUBLICATIONS

CHC Water Leak Sensor WD-2600 at www.home-control.co.uk/product/product_info.php?products_id=208.

(Continued)

*Primary Examiner*—Van T. Trieu
(74) *Attorney, Agent, or Firm*—Woodcock Washburn LLP

(57) ABSTRACT

An apparatus for sensing the presence of a conductive fluid on an upwardly facing generally planar surface of a floor, and a method of installation thereof. The apparatus includes an electrically insulating base dimensioned for installation under the floor such that the upwardly facing generally planar surface is maintained generally planar upon completion of the installation, The apparatus further includes first and second sensing conductors connected to the base and extending therefrom in generally parallel, spaced apart relation and being operable to be inserted into respective openings extending through the floor from a base contacting surface of the floor to the upwardly facing generally planar surface. Conductive fluid on the upwardly facing generally planar surface, in contact with and between the first and second conductors, is operable to conduct an electric current supplied by a sensing circuit connected to the first and second conductors.

31 Claims, 7 Drawing Sheets

OTHER PUBLICATIONS

"Water Alarms—Learn How C.A.M. Co. can help prevent water damage," at http://www.cam.surf1.com/, as of Jul. 20, 2004, 1 page.

"The Informer Water Detection Unit," at http://www.cam.surf1.com/informer.html, as of Jul. 20, 2004, 1 page.

* cited by examiner

FLUID DETECTION APPARATUS AND KIT, AND METHOD OF INSTALLATION THEREOF

BACKGROUND OF THE INVENTION

1. Field of Invention

This invention relates to fluid detection and, in particular, a conductive fluid detection apparatus and kit, and a method of installation thereof.

2. Description of Related Art

Fluid detectors are often used to detect flood conditions, such as when water or other electrically conductive fluid has flooded, leaked or spilled onto a floor or other similar surface. Conventional fluid detectors detect electrically conductive fluid by sensing an electrical current between two electrical terminals in contact with the conductive fluid.

Some conventional detectors, including battery powered mobile units, are placed or mounted on top of the floor upon which conductive fluid is to be detected. Placing or mounting a device on top of the floor, however, takes up floor space and creates a safety hazard to a person walking on the floor, for example. Safety concerns restrict the locations available for placing or mounting such conventional fluid detectors. a fluid detector placed or mounted on top of a floor may be unsightly and may damage the floor, such as by scraping the top surface of the floor. Furthermore, battery-powered units may fail unless their batteries are replaced or recharged regularly.

Some conventional detectors include pairs of wires arranged to form a mesh of such pairs, with each pair being pinned or nailed directly to the top surface of the floor. The pairs of wires each act as a pair of terminals for detecting electrically conductive fluid therebetween. However, the pins or nails used to install the mesh of wires damage the floor and may be unsightly. The wires are exposed and thus are susceptible to being damaged or broken by people walking on the floor and rodents gnawing at the wires, for example.

Some conventional detectors have the size and shape of a tile for incorporation into a tile floor. However, such a size and shape may fit only a small fraction of tile floors, given the wide variety of sizes and shapes of tiles available for use in tile floors. Furthermore, such detectors are limited to tile floors and a detector must be customized if it is to match the color and pattern of a distinctly designed tile floor. Even if the detector is so customized, the detector may still be obtrusive and unsightly.

SUMMARY OF THE INVENTION

The above shortcomings may be addressed by providing, in accordance with one aspect of the invention, an apparatus for sensing the presence of a conductive fluid on an upwardly facing generally planar surface of a floor. The apparatus includes an electrically insulating base dimensioned for installation under the floor such that the upwardly facing generally planar surface is maintained generally planar upon completion of the installation. The apparatus further includes first and second sensing conductors connected to the base and extending therefrom in generally parallel, spaced apart relation and being operable to be inserted into at least one opening extending through the floor from a sub-floor contacting surface of the floor to the upwardly facing generally planar surface. Conductive fluid on the upwardly facing generally planar surface, in contact with and between the first and second conductors, is operable to conduct an electric current supplied by a sensing circuit connected to the first and second conductors, to enable the sensing circuit to detect the presence of the conductive fluid.

The first and second sensing conductors may include first and second finishing caps respectively. The first and second conductors may be embedded in the insulating base.

The insulating base may include a plate, the first and second sensing conductors extending from the plate. The plate may be comprised of a plastic material. The plastic material may be soft enough to be cut by a knife. The plate may have a top surface, a bottom surface and first and second spaced apart openings extending from the bottom surface to the top surface and the first and second sensing conductors may extend through the first and second openings, respectively, from the bottom surface to the top surface. The first and second openings may have respective countersunk portions in the bottom surface of the plate and the first and second sensing conductors may have first and second tapered heads, respectively, for complementary engagement with the respective countersunk portions such that respective distal surfaces of distal end portions of the tapered heads are coplanar with or recessed from the bottom surface of the plate.

The first and second sensing conductors may have first and second threaded shafts that extend through the first and second openings, respectively. The first and second sensing conductors may include first and second finishing caps secured to the first and second threaded shafts respectively. Distal end portions of the tapered heads may include respective screw terminals facilitating connection of the first and second connectors to the first and second sensing conductors.

The apparatus may further include first and second wires respectively connected to the first and second sensing conductors respectively. The insulating base may have a bottom surface having a recess formed therein for receiving and holding the first and second wires while enabling the bottom surface to rest directly on a floor. The recess may extend to at least one side of the insulating base to allow the first and second wires to extend therefrom. The bottom surface may be generally planar.

The apparatus may further include a resistor connected between the first and second sensing conductors. The resistor may be embedded in the insulating base. The apparatus may include a resistor located in the recess and connected between the first and second sensing conductors.

In accordance with another aspect of the invention, there is provided a method of installing a sensor for sensing the presence of a conductive fluid on an upwardly facing generally planar surface of a floor. The method may involve forming at least one opening in the floor, the at least one opening extending from a sub-floor contacting surface of the floor to the upwardly facing generally planar surface of the floor. The method may further involve installing an electrically insulating base of the sensor under the floor such that first and second sensing conductors extending from the base are in the at least one opening and such that the upwardly facing generally planar surface of the floor is generally planar. The method may further involve connecting the first and second conductors to a sensing circuit operable to supply an electric current to at least one of the first and second conductors such that conductive fluid on the upwardly facing generally planar surface in contact with and between the first and second conductors is operable to conduct the electric current provided by the sensing circuit between the first and second conductors.

In accordance with another aspect of the invention, there is provided a method of installing a sensor for sensing the presence of a conductive fluid on an upwardly facing generally planar surface of a floor. The method may involve laying an electrically insulating base of the sensor on a surface of a sub-floor to be covered with a floor, such that first and second sensing conductors extend generally perpendicularly from the base, in generally parallel spaced apart relation. The method may further involve connecting the first and second sensing conductors to a sensing circuit operable to supply an electric current to at least one of the first and second conductors and installing the floor on the sub-floor such that the first and second sensing conductors extending from the base are in first and second openings respectively in the floor and such that the upwardly facing generally planar surface of the floor is generally planar and not locally raised by the insulated base, whereby conductive fluid on the upwardly facing generally planar surface in contact with and between the first and second conductors is operable to conduct the electric current provided by the sensing circuit between the first and second conductors.

The method may involve installing the floor covering such that an upwardly facing surface of the floor covering is generally coplanar with a top surface of the first and second sensing conductors. The method may involve forming the first and second openings in tile grout about the first and second sensing conductors. The method may further involve installing first and second protective caps on the first and second sensing conductors respectively, prior to placing the tile grout. Forming the first and second openings may involve placing uncured tile grout about the first and second protective caps on the sensing conductors and over at least a portion of the insulating base, and allowing the tile grout to cure. The method may further involve removing the first and second protective caps after the tile grout has at least partially cured, to expose the first and second sensing conductors. The method may further involve installing first and second conductive finishing caps on the first and second sensing conductors respectively.

In accordance with another aspect of the invention, there is provided a floor water sensor kit. The kit may include an electrically insulating base and first and second sensing conductors adapted to cooperate with the base to be secured to the base and to extend in generally parallel spaced apart relation therefrom, whereby the base and the first and second sensing conductors are operable to be assembled and installed on a sub-floor, under a floor, such that the first and second sensing conductors extend through at least one opening in the floor.

The kit may further include packaging for packaging the base and the first and second sensing conductors. The kit may further include first and second protective caps operable to cover the first and second sensing conductors, when the first and second sensing conductors are connected to the base. The kit may further include first and second conductive finishing caps operable to cover the first and second sensing conductors when the base and first and second sensing conductors are assembled and installed under the floor. The base may include a plate.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
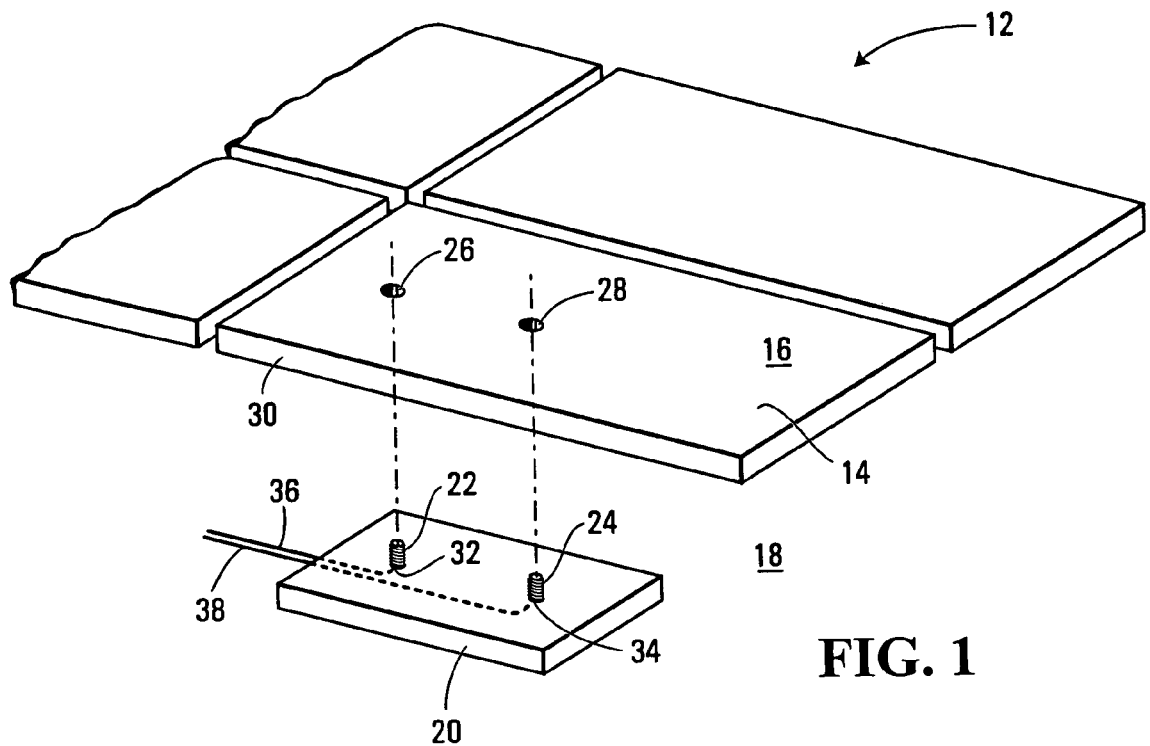
FIG. 1 is a perspective view of an apparatus for sensing the presence of a conductive fluid on an upwardly facing generally planar surface of a floor with an adjacent sub-floor and floor exploded relative thereto, according to a first embodiment of the invention.

Referring to FIG. 1, an apparatus for sensing the presence of a conductive fluid on an upwardly facing generally planar surface of a floor, according to a first embodiment of the invention, is shown generally at 10. An exemplary floor such as laminate flooring shown generally at 12 includes a floor board 14 having an upwardly facing generally planar surface 16 on which a conductive fluid such as water, for example, may lie, in the event of a burst water pipe or water system failure, for example. Floor boards of the type shown at 14 are arranged on a sub-floor 18 formed of plywood, for example, to form a floor of a building or deck. The apparatus 10 includes an electrically insulating base 20 dimensioned for installation under the floor 12 such that the upwardly facing generally planar surface 16 is maintained generally planar upon completion of the installation. Generally planar means that planarity is preserved over the whole floor. A person of ordinary skill in the art will appreciate that the top surface of the floor is likely not perfectly planar. For example, slate tiles have uneven top surfaces and the top of the grout placed between the tiles is rarely perfectly flush with the top of each tile. However, a person of ordinary skill in the art will appreciate that the top of the floor is considered generally planar when the floor is considered as a whole. It is in this sense that the upwardly facing generally planar surface of the floor covering is considered generally planar.

The apparatus 10 includes first and second sensing conductors 22 and 24 connected to the base 20 and extending therefrom in generally parallel, spaced apart relation. The first and second sensing conductors 22 and 24 may be provided by ¼×¾" stainless steel screws, for example, and may be spaced apart by about 1 inch (2.54 cm), for example. The first and second sensing conductors are operable to be inserted into at least one opening such as an oblong or elongated rectangular opening extending through the floor board 14 or operable to extend through first and second openings 26 and 28, respectively, as shown. The opening or openings should extend through the floor board 14, from a sub-floor contacting surface 30 of the floor board 14 to the upwardly facing generally planar surface 16.

The apparatus 10 may further include first and second connectors 32 and 34 for connecting the first and second sensing conductors 22 and 24 respectively to a sensing circuit (not shown) such as by wires 36 and 38 for example.

Figure 2:
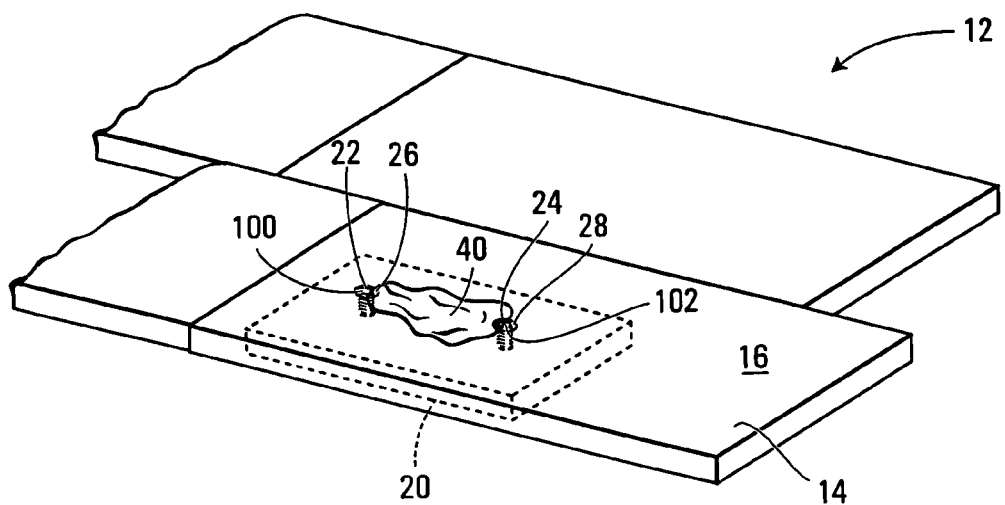
FIG. 2 is a perspective view of the apparatus shown in FIG. 1 in a finished arrangement under the floor.

Referring to FIG. 2, conductive fluid 40 such as water from a burst pipe, on the upwardly facing generally planar surface 16, in contact with and between the first and second sensing conductors 22 and 24, is operable to conduct an electric current supplied by the sensing circuit, between the first and second conductors, to enable the sensing circuit to sense a change in current flow between the first and second conductors and, in response to the change, to actuate an alarm or control function such as shutting of a main water supply, for example.

Figure 3:
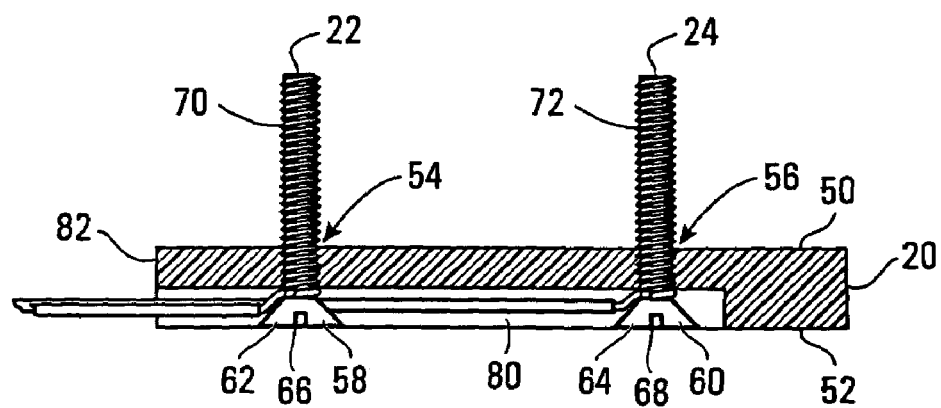
FIG. 3 is a cross-sectional view of the apparatus shown in FIG. 1.

Referring to FIG. 3, the insulating base 20 may include a plate, comprised of a plastic material, soft enough to be cut by a knife to allow for customized trimming to a desired length or width during installation. The base 20 may have a top surface 50, a bottom surface 52 and first and second spaced apart openings 54 and 56 extending from the bottom surface 52 to the top surface 50. The first and second sensing conductors 22 and 24 extend through the first and second openings 54 and 56, respectively, from the bottom surface 52 to the top surface 50 and extend outwardly, away from the top surface 50, generally normal thereto.

The first and second openings 54 and 56 may have respective recessed or countersunk portions 58 and 60 in the bottom surface 52 of the plate and the first and second sensing conductors 22 and 24 may be provided by stainless steel screws, for example, having first and second complementary shaped heads 62 and 64, respectively, for complementary engagement with the respective recessed portions 58 and 60 such that respective distal surfaces 66 and 68 of the heads are coplanar with, or recessed from, the bottom surface 52 of the plate.

The first and second sensing conductors 22 and 24 may have first and second threaded shafts 70 and 72 that extend through and engage complementary threaded portions 74 and 76 of the first and second openings 54 and 56, respectively. Alternatively, the first and second sensing conductors 22 and 24 may be cast or embedded in the base 20, or a nut may be used on each of the first and second threaded shafts 70 and 72 to secure the first and second sensing conductors to the base.

Where the first and second sensing conductors 22 and 24 are threaded, the first and second sensing conductors and the threaded openings 54 and 56 in the base 20 may act as respective screw terminals facilitating connection of the first and second wires 36 and 38 to the first and second sensing conductors. Alternatively, as shown in FIG. 5, the heads 62 and 64 may be formed with separate screw terminals 63 and 65 within the heads, to which the first and second wires 36 and 38 may be secured to the first and second sensing conductors 22 and 24.

Figure 4:
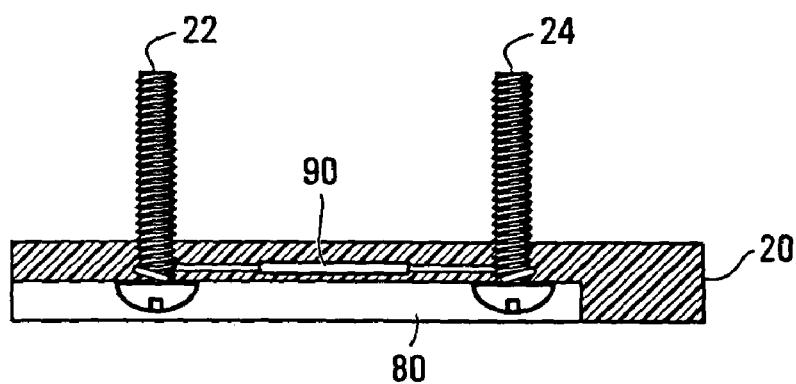
FIG. 4 is a cross-sectional view of the apparatus shown in FIG. 1 with an optional embedded resistor.
Figure 5:
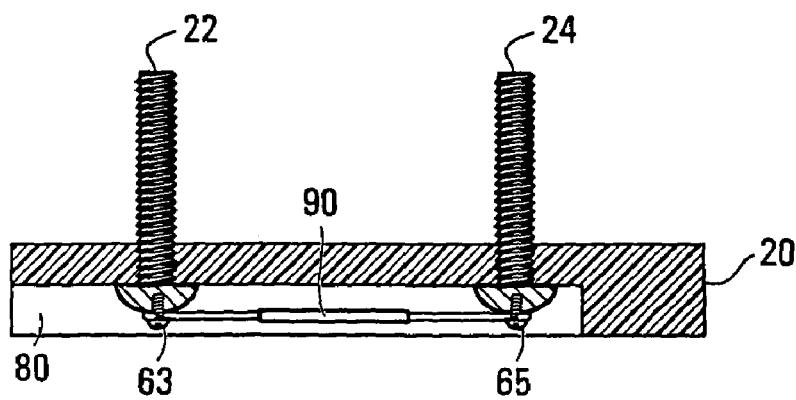
FIG. 5 is a cross-sectional view of the apparatus shown in FIG. 1 with an optional resistor shown in a recess thereof.

Referring to FIGS. 3–5, the wires may be wrapped around the screw terminals 63 and 65 or may be wrapped around the screw terminals formed by the first and second sensing conductors 22 and 24 and their engagement with the threaded portions 74 and 76 of the first and second openings 54 and 56. Alternatively, the wires may be terminated in ring type or fork type crimp connectors, for example, for a better, more reliable connection to the first and second sensing conductors 22 and 24.

A recess 80 may be formed in the bottom surface 52 of the base 20 for receiving and holding the first and second wires 36 and 38 while enabling adjacent coplanar portions of the bottom surface 52 of the base 20 to rest directly on the sub-floor 18. The recess 80 need only be wide enough to hold the wires and may be provided by a groove in the bottom surface 52 of the base 20, for example. The recess 80 may extend to one side 82 of the insulating base 20 to allow the first and second wires 36 and 38 to extend therefrom.

Referring to FIGS. 4 and 5, the apparatus may further include a resistor 90 connected between the first and second sensing conductors 22 and 24. The resistor 90 may be embedded in the insulating base 20 as shown in FIG. 4 or the resistor may be separately installed in the recess 80. Alternatively, the base 20 itself may be formed of a resistive material to define a resistance between the first and second sensing conductors 22 and 24 or a resistive path may be formed on the base by deposition of a resistive material, for example, between the first and second sensing conductors. The resistor or resistance may be between about 200 and 300 ohms, for example, and sets a fixed reference resistance between the first and second sensing conductors 22 and 24, such that the resistance measured between the first and second sensing conductors is normally between 200 and 300 ohms unless water bridges between the first and second sensing conductors resulting in a parallel resistance, which reduces the overall resistance measured between the first and second sensing conductors. Should the measured resistance between the first and second sensing conductors decrease, it may be assumed that water is bridging the first and second sensing conductors. Should the measured resistance increase, this may indicate that there is a loose connection at the sensor or the sensor is otherwise defective.

A method of installing the sensor apparatus described above may involve forming at least one opening in the floor board 14 of a new or existing floor installation. Where there are two separate openings in the floor board 14, such as the openings 26 and 28, the diameter of the openings can be about the same diameter as the first and second sensing conductors 22 and 24 or slightly larger. In general, where more than one opening is employed, the openings 26 and 28 desirably have a shape generally complementary to the shape of the first and second sensing conductors 22 and 24.

After the opening or openings have been formed, the base 20 may be installed under the floor board 14 such that first and second sensing conductors 22 and 24 extending from the base are in the at least one opening and such that the upwardly facing generally planar surface 16 of the floor board 14 is generally planar relative to the remainder of the floor 12. It may be necessary to cut out a notch or recess in the sub-floor 18 or the floor board 14 so that the base 20 can be installed in the recess so that the top surface 50 is generally coplanar with an upper surface of the sub-floor 18 or so that the bottom surface 52 is coplanar with the top surface of the sub-floor 18, to ensure that the upwardly facing generally planar surface 16 of the floor covering is generally planar with the rest of the floor and is not locally raised by the base thereunder. This ensures that the presence of the sensor apparatus remains unobtrusive. Prior to installing the base 20, the wires 36 and 38 may be connected to the first and second sensing conductors 22 and 24 to connect the first and second sensing conductors to the sensing circuit (not shown). Conductive fluid on the upwardly facing generally planar surface 16 in contact with and between the first and second sensing conductors 22 and 24 is operable to conduct electric current supplied by the sensing circuit between the first and second sensing conductors.

Referring to FIG. 2, installing the sensor apparatus 10 may involve installing the floor 12 such that the upwardly facing surface 16 of the floor 12 is generally coplanar with top surfaces 100 and 102 of the first and second sensing conductors 22 and 24.

Figure 6:
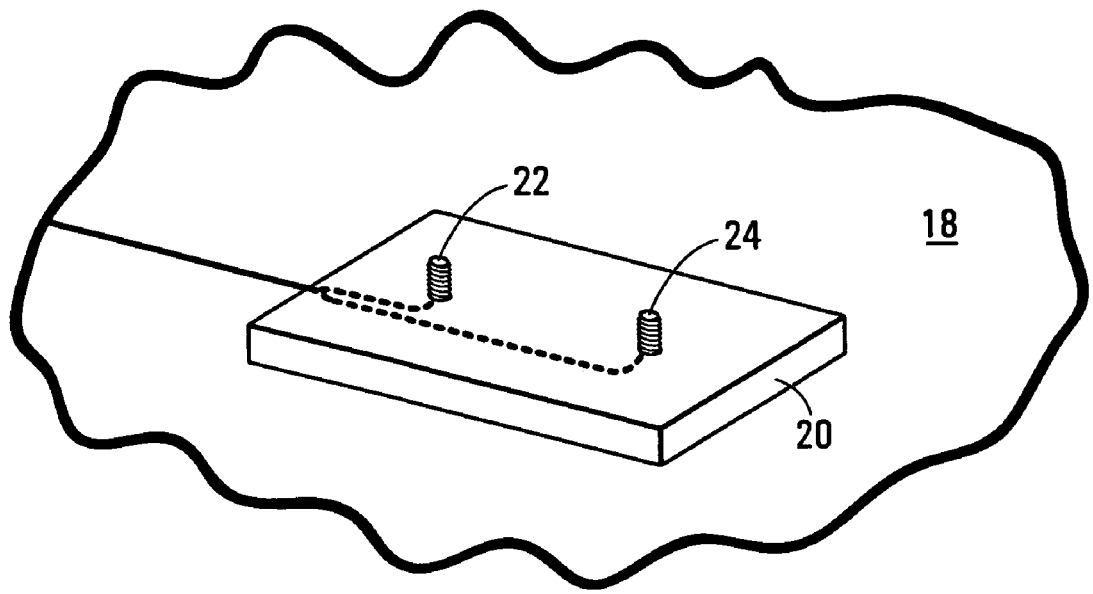
FIG. 6 is a perspective view showing the apparatus positioned on a sub-floor to be covered with ceramic tiles.
Figure 10:
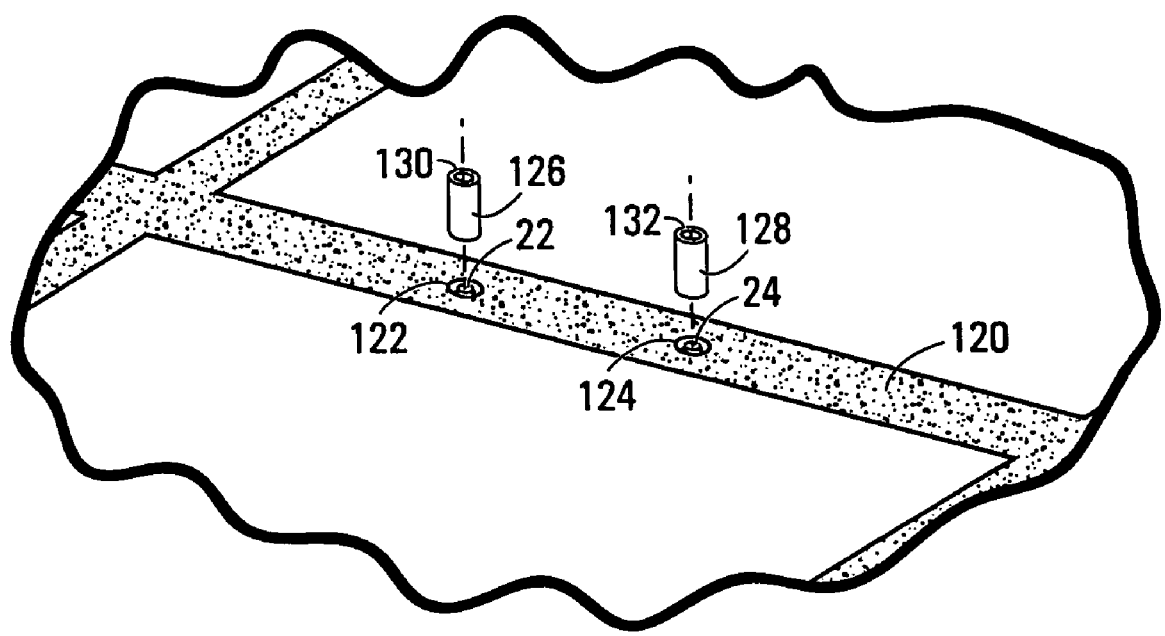
FIG. 10 is a perspective view of the apparatus shown in FIGS. 6 through 9, wherein the protective caps have been removed to expose openings in cured tile grout, about the first and second conductors and showing the installation of finishing caps on the first and second conductors, in the openings in the tile grout.

The apparatus 10 may be used with various types of floors including tile floors. Referring to FIG. 6, for use with a tile floor, the first and second wires 36 and 38 are first connected to the first and second sensing conductors 22 and 24 and laid in the recess 80 in the base 20. The base 20 is then laid on the sub-floor 18 such that the lower surface 52 is in contact and coplanar therewith. The base 20 is desirably located in a location on the sub-floor 18 where a tile grout line is expected to occur. Referring to FIG. 10, installing the floor 12 may involve forming first and second openings 122 and 124 in tile grout about the first and second sensing conductors 22 and 24.

Figure 7:
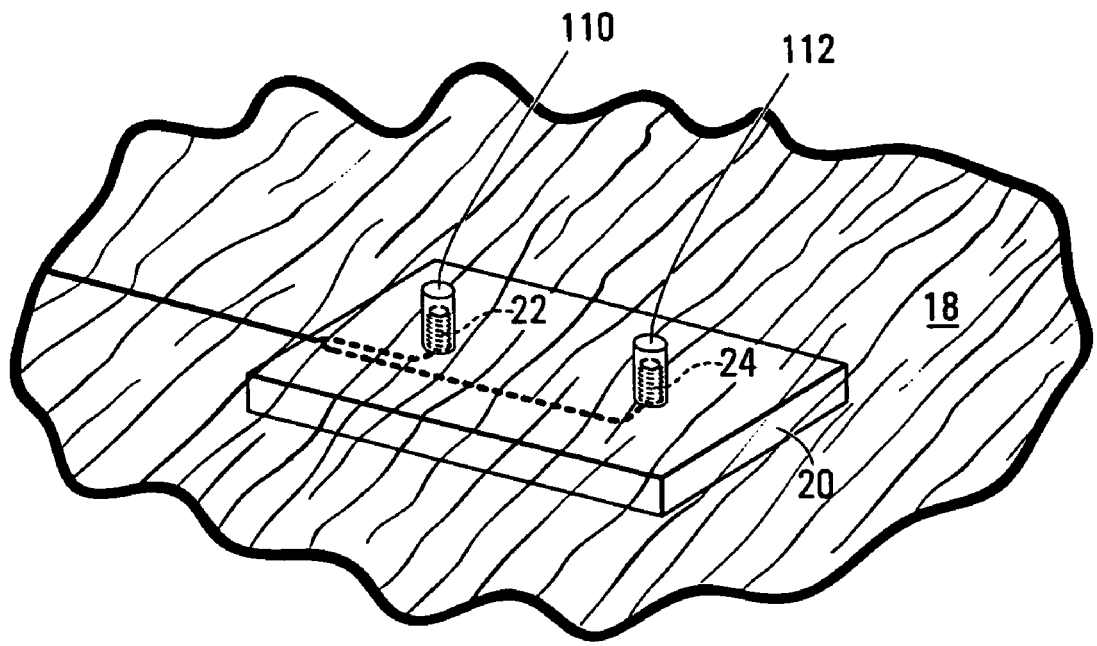
FIG. 7 is a perspective view of the apparatus shown in FIG. 6 with protective caps installed thereon and thinset mortar being applied thereabout.

Referring to FIG. 7, to form the first and second openings 122 and 124, first and second protective caps 110 and 112 are installed on the first and second sensing conductors 22 and 24 respectively. The protective caps 110 and 112 may be dimensioned to frictionally engage the first and second sensing conductors 22 and 24 or may threadedly engage therewith, for example. After the caps 110 and 112 are installed to protect the threaded shafts of the first and second sensing conductors 22 and 24, thinset mortar 114 may be placed on the sub-floor 18 in the usual manner. The thinset mortar 114 may be applied and built-up to a thickness slightly exceeding the thickness of the base 20, for example.

Figure 8:
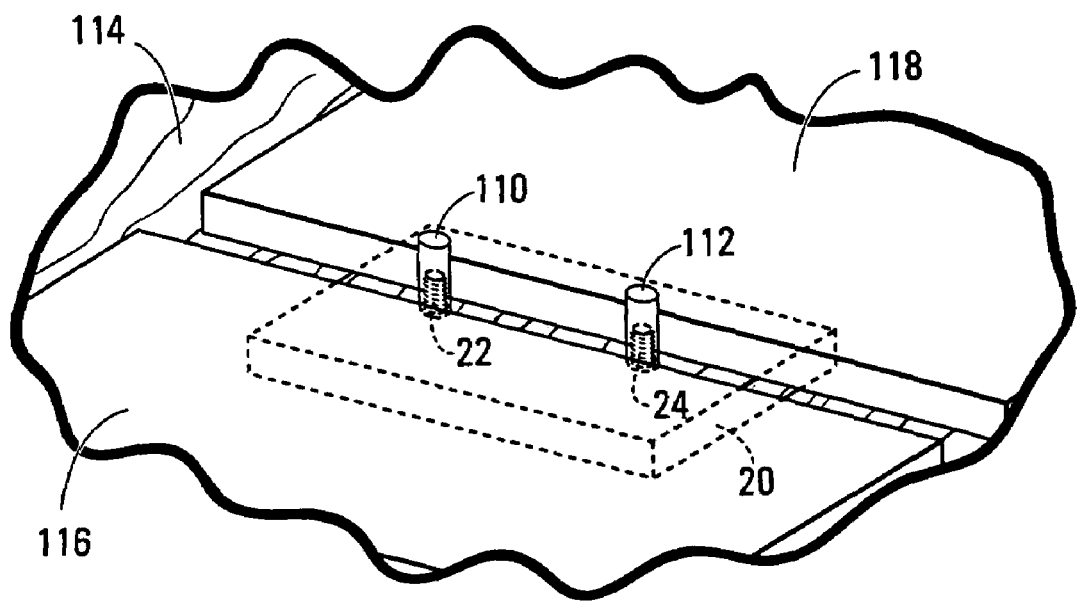
FIG. 8 is a perspective view of the apparatus shown in FIG. 6 with tiles placed on the thinset mortar adjacent the first and second conductors and in a grout line between said tiles.

Referring to FIG. 8, tiles 116 and 118 may then be set on opposite sides of the first and second sensing conductors 22 and 24 and the thinset mortar may be allowed to cure to secure the tiles 116 and 118 to the sub-floor 18. The thinset mortar may also be used to secure the base 20 to the sub-floor 18.

Figure 9:
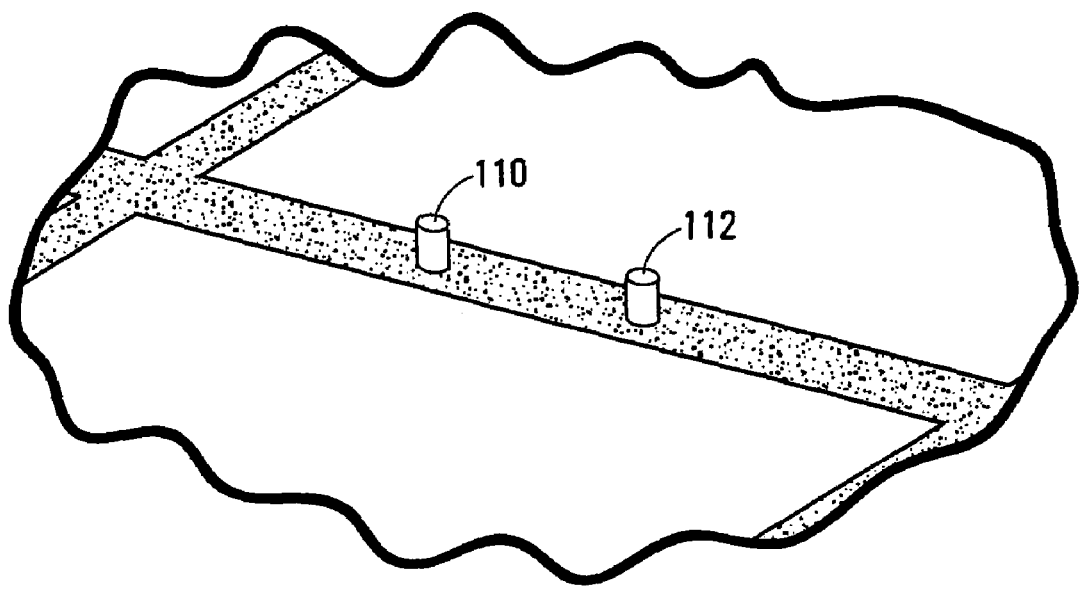
FIG. 9 is a perspective view of the apparatus shown in FIGS. 6 to 8, with grout installed between the tiles and about the first and second conductors.

Referring to FIG. 9, uncured tile grout 120 may then be applied between the tiles 116 and 118 about the first and second protective caps 110 and 112 and allowed to cure.

Referring to FIG. 10, the first and second protective caps 110 and 112 may be removed after the tile grout 120 has at least partially cured, leaving openings 122 and 124 in the cured tile grout 120, exposing the first and second sensing conductors 22 and 24 therein. First and second conductive finishing caps 126 and 128 may then be installed on the first and second sensing conductors 22 and 24 respectively. The length of the finishing caps 126 and 128 may be selected such that distal surfaces 130 and 132 of the caps are either coplanar with, or protrude slightly from, the generally upwardly facing surface 16 of the tile floor 12. The finishing caps 126 and 128 may have screw-type openings 134 and 136, for example, enabling use of a screw driver or hex key, for example, to tighten the finishing caps on the first and second sensing conductors 22 and 24 respectively.

Figure 11:
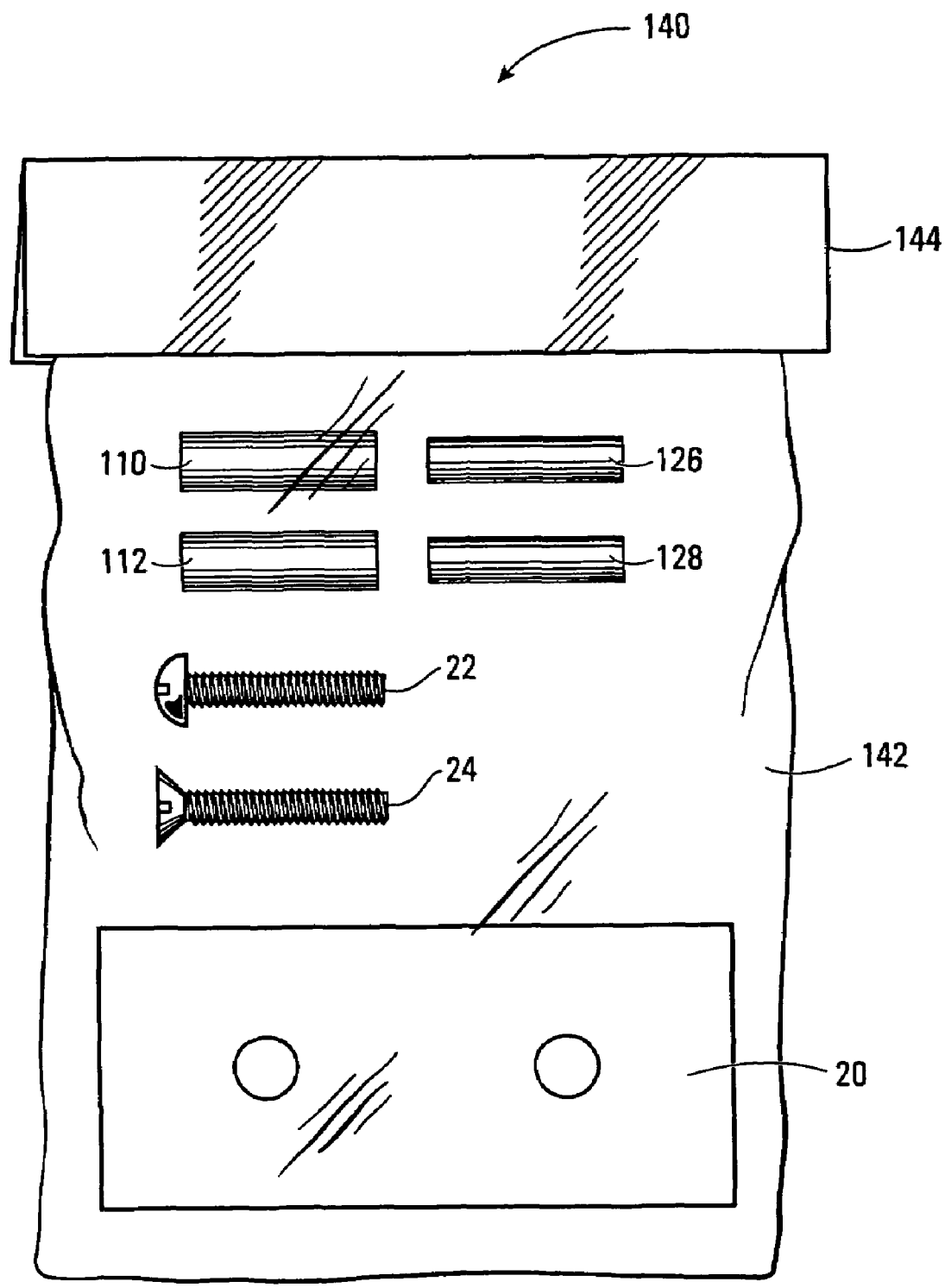
FIG. 11 is a schematic representation of a kit for packaging the apparatus shown in FIGS. 1 through 10.

Referring to FIG. 11, the apparatus may be sold as a floor water sensor kit 140. The kit 140 may include the electrically insulating base 20 and the first and second sensing conductors 22 and 24 adapted to cooperate with the base to be secured thereto and to extend in generally parallel spaced apart relation therefrom. The base 20 and the first and second sensing conductors 22 and 24 are preferably dimensioned and configured to be installed on a sub-floor 18, under a floor 12, preferably before the floor is laid such that the first and second sensing conductors extend through an opening or openings in the floor.

The kit may further include packaging including a transparent plastic bag 142 and a cardboard top 144, for example, for packaging the base 20 and the first and second sensing conductors 22 and 24 inside the plastic bag. The kit may optionally include the first and second protective caps 110 and 112 operable to cover and protect threaded portions of the first and second sensing conductors 22 and 24, when the apparatus is used on a floor 12 comprising a curable material such as tile grout. The kit may further include the first and second conductive finishing caps 126 and 128 to aesthetically and conductively cover the first and second sensing conductors 22 and 24 when the apparatus 10 is installed under the floor 12.

Figure 12:
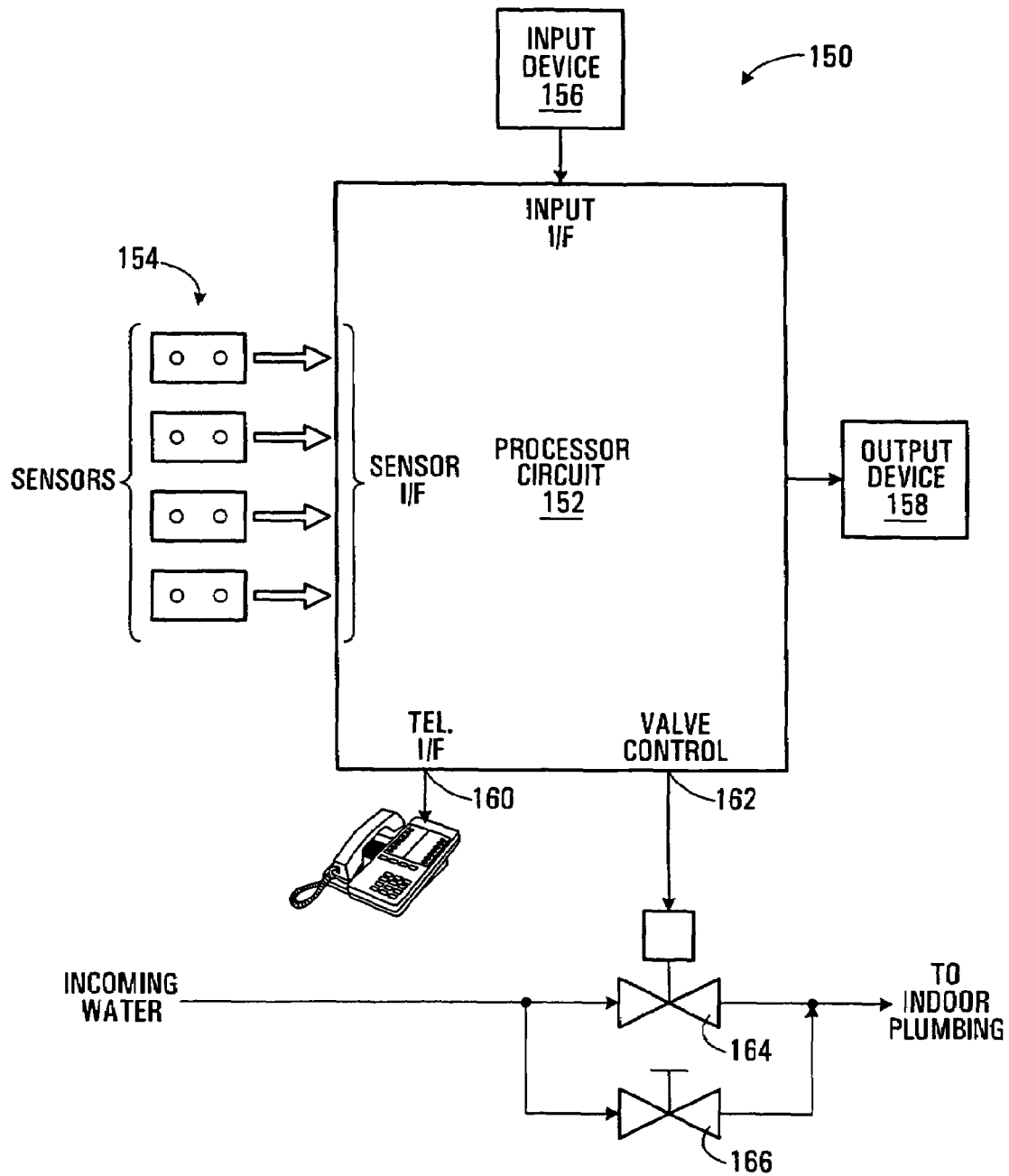
FIG. 12 is a block diagram of a flood detection system employing the apparatus shown in FIGS. 1-10.

Referring now to FIG. 12, a flood detection system according to a first embodiment of the invention is shown generally at 150 The system 150 includes a processor circuit 152, a plurality of sensors 154, of the type described above, an input device 156, an output device 158, a telephonic interface 160, a valve control interface 162, an electrically-controllable valve 164 and a manual bypass valve 166. The outputs of the plurality of sensors 154 are connected as inputs to the processor circuit 152. The processor circuit 152 monitors the resistance/conductance at each sensor and when it detects a condition indicative of a flood at at least one sensor, it takes appropriate action as was previously defined by a user through the input device 156.

Possible actions to be taken by the processor circuit 152 may include communicating an alarm condition to an output device 158, calling an alarm company through the telephonic interface 160, or taking remedial action by using the valve control interface 162 to actuate the electrically-controllable valve 164 so as to shut off incoming water flow in order to mitigate water damage.

The output device 158 may include an alarm system to which an indication of the alarm condition is forwarded, for example, or else the output device 158 may include a display device on which the alarm condition is annunciated, for example.

If the electrically-controllable valve 164 is of a type that cannot be opened manually when there is a power shortage, an optional manual bypass valve 166 may be put in parallel with the electrically-controllable valve 164 to allow the user to open the valve 166 manually during a power outage in order to ensure a continuous water supply.

The processor circuit 152 may further include provisions for allowing a time delay to be set and adjusted through the input device 156 in order to disregard false alarms such as instances when the floor is being washed, wherein a change in conductance between the first and second conductors of any given sensor due to water on the floor is ignored by the processor circuit 152 if the change occurs for a time shorter than a set time delay threshold.

The above invention may have particular uses for detecting burst pipes or other problems in a domestic or industrial setting and may be of interest to insurance companies wishing to have an early warning of an incipient flood in order to prevent costly water damage.

While specific embodiments of the invention have been described and illustrated, such embodiments should be considered illustrative of the invention only and not as limiting the invention as construed in accordance with the accompanying claims.

What is claimed is:

1. An apparatus for sensing the presence of a conductive fluid on an upwardly facing generally planar surface of a floor, the apparatus comprising:
    an electrically insulating base dimensioned for installation under the floor such that the upwardly facing generally planar surface is maintained generally planar upon completion of said installation;
    first and second sensing conductors connected to said base and extending therefrom in generally parallel, spaced apart relation and being operable to be inserted into at least one opening extending through the floor from a sub-floor contacting surface of the floor to the upwardly facing generally planar surface,
    whereby conductive fluid on the upwardly facing generally planar surface, in contact with and between said first and second conductors, is operable to conduct an electric current when a sensing circuit is connected to said first and second conductors.

2. The apparatus of claim 1 wherein said first and second sensing conductors include first and second finishing caps respectively.

3. The apparatus of claim 1 wherein said first and second conductors are embedded in said insulating base.

4. The apparatus of claim 1 wherein said insulating base includes a plate, said first and second sensing conductors extending from said plate.

5. The apparatus of claim 4 wherein said plate is comprised of a plastic material.

6. The apparatus of claim 5 wherein said plastic material is soft enough to be cut by a knife.

7. The apparatus of claim 4 wherein said plate has a top surface, a bottom surface and first and second spaced apart openings extending from said bottom surface to said top surface and wherein said first and second sensing conductors extend through said first and second openings, respectively, from said bottom surface to said top surface.

8. The apparatus of claim 7 wherein said first and second openings have respective countersunk portions in said bottom surface of said plate and wherein said first and second sensing conductors have first and second tapered heads, respectively, for complementary engagement with said respective countersunk portions such that respective distal surfaces of distal end portions of said tapered heads are coplanar with or recessed from said bottom surface of said plate.

9. The apparatus of claim 8 wherein said distal end portions of said tapered heads include respective screw terminals facilitating connection of first and second connectors to said first and second sensing conductors.

10. The apparatus of claim 7 wherein said first and second sensing conductors have first and second threaded shafts that extend through said first and second openings in said base, respectively.

11. The apparatus of claim 10 wherein said first and second sensing conductors include first and second finishing caps secured to said first and second threaded shafts respectively.

12. The apparatus of claim 1 further including first and second wires respectively connected to said first and second sensing conductors respectively.

13. The apparatus of claim 12 wherein said insulating base has a bottom surface having a recess formed therein for receiving and holding said first and second wires while enabling said bottom surface to rest directly on a sub-floor.

14. The apparatus of claim 13 wherein said recess extends to at least one side of said insulating base to allow said first and second wires to extend therefrom.

15. The apparatus of claim 13 wherein said bottom surface is generally planar about said recess.

16. The apparatus of claim 13 further comprising a resistor located in said recess and connected between said first and second sensing conductors.

17. The apparatus of claim 1 further comprising a resistor connected between said first and second sensing conductors.

18. The apparatus of claim 17 wherein said resistor is embedded in said insulating base.

19. A method of installing a sensor for sensing the presence of a conductive fluid on an upwardly facing generally planar surface of a floor, the method comprising:
    forming at least one opening in the floor, said at least one opening extending from a sub-floor contacting surface of the floor to the upwardly facing generally planar surface of the floor;
    installing an electrically insulating base of the sensor under the floor such that first and second sensing conductors extending from said base are in said at least one opening and such that the upwardly facing generally planar surface of said floor is generally planar; and
    connecting said first and second conductors to a sensing circuit operable to supply an electric current to at least one of said first and second conductors such that conductive fluid on the upwardly facing generally planar surface in contact with and between said first and second conductors is operable to conduct said electric current between said first and second conductors.

20. A method of installing a sensor for sensing the presence of a conductive fluid on an upwardly facing generally planar surface of a floor, the method comprising:
    laying an electrically insulating base of the sensor on a flat surface of a sub-floor to be covered with a floor, such that first and second sensing conductors extend generally perpendicularly from said base, in generally parallel spaced apart relation;
    connecting said first and second sensing conductors to a sensing circuit operable to supply an electric current to at least one of said first and second conductors;
    installing the floor on said sub-floor such that said first and second sensing conductors extending from said base are in at least one opening in said floor and such that the upwardly facing generally planar surface of said floor is generally planar and not locally raised by said insulated base,
    whereby conductive fluid on the upwardly facing generally planar surface in contact with and between said first and second conductors is operable to conduct said electric current between said first and second conductors.

21. The method of claim 20 wherein installing the floor comprises installing the floor such that an upwardly facing surface of the floor is generally coplanar with a top surface of said first and second sensing conductors.

22. The method of claim 20 wherein installing the floor comprises forming first and second openings in tile grout about said first and second sensing conductors.

23. The method of claim 22 further comprising installing first and second caps on said first and second sensing conductors respectively, prior to placing said tile grout.

24. The method of claim 23 wherein forming said first and second openings comprises placing uncured tile grout about said first and second caps on said sensing conductors and over at least a portion of said insulating base, and allowing said tile grout to cure.

25. The method of claim 24 further comprising removing said first and second caps after said tile grout has at least partially cured, to expose said first and second sensing conductors.

26. The method of claim 25 further comprising installing first and second conductive finishing caps on said first and second sensing conductors respectively.

27. A floor water sensor kit comprising:
an electrically insulating base; and
first and second sensing conductors adapted to cooperate with said base to be secured to said base and to extend in generally parallel spaced apart relation therefrom;
whereby said base and said first and second sensing conductors are operable to be assembled and installed on a sub-floor, under a floor, such that said first and second sensing conductors extend through at least one opening in said floor.

28. The kit of claim 27 further comprising packaging for packaging said base and said first and second sensing conductors.

29. The kit of claim 28 further comprising first and second conductive finishing caps operable to cover said first and second sensing conductors when said base and said first and second sensing conductors are installed under said floor.

30. The kit of claim 27 further comprising first and second protective caps operable to cover said first and second sensing conductors, when said first and second sensing conductors are connected to said base.

31. The kit of claim 27 wherein said base includes a plate.

* * * * *